US010922070B2

(12) United States Patent
Lappi et al.

(10) Patent No.: US 10,922,070 B2
(45) Date of Patent: Feb. 16, 2021

(54) HARDWARE ASSISTED FIRMWARE DOWNLOAD SYNCING

(71) Applicant: Western Digital Technologies, Inc., San Jose, CA (US)

(72) Inventors: Cory Lappi, Rochester, MN (US); William Jared Walker, Rochester, MN (US); Xin Chen, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 241 days.

(21) Appl. No.: 16/057,564

(22) Filed: Aug. 7, 2018

(65) Prior Publication Data

US 2019/0087172 A1 Mar. 21, 2019

Related U.S. Application Data

(60) Provisional application No. 62/561,614, filed on Sep. 21, 2017.

(51) Int. Cl.
*G06F 9/44* (2018.01)
*G06F 8/654* (2018.01)
*G06F 8/61* (2018.01)
*G06F 16/27* (2019.01)
*G06F 9/52* (2006.01)

(52) U.S. Cl.
CPC .............. *G06F 8/654* (2018.02); *G06F 8/61* (2013.01); *G06F 9/52* (2013.01); *G06F 16/27* (2019.01)

(58) Field of Classification Search
CPC ... G06F 8/654; G06F 8/61; G06F 9/52; G06F 16/27

USPC ......................................................... 717/173
See application file for complete search history.

(56) References Cited

U.S. PATENT DOCUMENTS

| | | | | |
|---|---|---|---|---|
| 5,781,921 | A * | 7/1998 | Nichols ..................... | G06F 8/65 711/115 |
| 6,640,334 | B1 * | 10/2003 | Rasmussen ............... | G06F 8/65 717/169 |
| 8,589,910 | B2 * | 11/2013 | Zubas ..................... | G06F 8/654 717/173 |
| 2007/0271317 | A1 * | 11/2007 | Carmel ................... | G06F 16/27 |
| 2010/0317401 | A1 * | 12/2010 | Lee ......................... | G06F 16/27 455/557 |
| 2011/0153779 | A1 * | 6/2011 | Mendez .................. | G06Q 10/10 709/218 |

(Continued)

OTHER PUBLICATIONS

Title: Firmware transitional logic for on-line monitoring and control; author: P Dersin, et al published on 1986.*

(Continued)

*Primary Examiner* — Chameli Das
(74) *Attorney, Agent, or Firm* — Patterson & Sheridan, LLP; Steven H. Versteeg

(57) ABSTRACT

A method for performing a download operation is described comprising detecting an updated firmware for installation, transmitting at least one slice of the updated firmware from an updated firmware location to a second firmware location, determining if a synchronization has completed with the at least one slice of the updated firmware and determining if additional slices are to be synchronized when the synchronization has completed with the at least one slice of the updated firmware.

22 Claims, 2 Drawing Sheets

(56) References Cited

U.S. PATENT DOCUMENTS

| | | | |
|---|---|---|---|
| 2012/0291021 A1* | 11/2012 | Banerjee | G06F 8/654 |
| | | | 717/173 |
| 2013/0111461 A1* | 5/2013 | Zubas | G06F 8/654 |
| | | | 717/173 |
| 2014/0279882 A1* | 9/2014 | Weiler | G06F 19/3418 |
| | | | 707/617 |
| 2014/0282486 A1* | 9/2014 | Hisamoto | G06F 8/65 |
| | | | 717/173 |
| 2017/0017481 A1* | 1/2017 | Cherian | G06F 3/017 |
| 2017/0185794 A1* | 6/2017 | Mensch | G06F 21/6218 |
| 2017/0220404 A1* | 8/2017 | Polar Seminario | |
| | | | G06F 11/0736 |
| 2018/0196656 A1* | 7/2018 | Miller | H04L 67/12 |
| 2018/0262593 A1* | 9/2018 | Osterloh | H04L 67/34 |

OTHER PUBLICATIONS

Forked and integrated variants in an open-source firmware project author: Ş Stănciulescu published on 2015.*

* cited by examiner

HARDWARE ASSISTED FIRMWARE DOWNLOAD SYNCING

CROSS-REFERENCE TO RELATED APPLICATIONS

The present disclosure claims priority to U.S. Provisional Application 62/561,614 filed Sep. 21, 2017, the entirety of which is incorporated by reference.

BACKGROUND OF THE DISCLOSURE

Field of the Disclosure

Embodiments of the present disclosure generally relate to a storage device and a method of operating the storage device. More specifically, aspects of the present disclosure relate to hardware assisted firmware download syncing operations and arrangements.

Description of the Related Art

From time to time, firmware needs to be updated. This is particularly true when bugs are discovered in firmware, firmware is rewritten to perform a new task, or firmware is rewritten to perform specified tasks in a different order. Firmware updates to storage devices can be challenging.

Firmware updates need to be downloaded to the device, but the firmware downloads are typically either power-safe with a long response time or quick without being power-safe. Power-safe is understood to be safe in the event of a power loss. The firmware may be downloaded to a fast media (i.e., NAND) and then synced to the slower, traditional boot media (i.e., NOR), but the syncing can take a long time. The syncing can impact drive controller processing power and affect device performance.

The host device processor can perform the sync in slices through time in the background when time permits, but such a process is both time consuming and inefficient. Alternatively, device processing power can be utilized to perform the sync and thus negatively impact device performance.

Therefore, there is a need to sync new firmware in the background without negatively impacting device performance and at a fast rate.

There is also a need to perform a sync of new firmware in a cost efficient manner.

There is also a need to perform synchronization methods that are safe and programmatically efficient.

SUMMARY OF THE DISCLOSURE

The present disclosure generally relates to leveraging either an asynchronous GPDMA hardware unit or a low-power co-processor to perform the background download update slices.

In one non-limiting embodiment, a method for performing a download operation is disclosed comprising detecting an updated firmware for installation, transmitting at least one slice of the updated firmware from an updated firmware location to a second firmware location, determining if a synchronization has completed with the at least one slice of the updated firmware, determining if additional slices are to be synchronized when the synchronization has completed with the at least one slice of the updated firmware, sending at least one additional slice of the updated firmware from the updated firmware location to the second firmware location when the determining if the additional slices are to be synchronized when the synchronization has completed with the at least one slice of the updated firmware and performing a synchronization of the at least one additional slice of the updated firmware.

In another non-limiting embodiment, an arrangement for performing a download operation is disclosed comprising means for detecting an updated firmware for installation, means for transmitting at least one slice of the updated firmware from an updated firmware location to a second firmware location, means for determining if a synchronization has completed with the at least one slice of the updated firmware, means for determining if additional slices are to be synchronized when the synchronization has completed with the at least one slice of the updated firmware and means for sending at least one additional slice of the updated firmware from the updated firmware location to the second firmware location when the determining if the additional slices are to be synchronized when the synchronization has completed with the at least one slice of the updated firmware.

In another non-limiting embodiment, a method for performing a download operation for a memory device, is disclosed comprising using a processor, detecting an updated firmware for installation in a memory arrangement, transmitting at least one slice of the updated firmware from the memory arrangement to a second firmware location, performing a synchronization of the at least one slice of the updated firmware to form a copy of the updated firmware, determining after synchronization if the copy of the updated firmware is completed, transmitting further slices of the updated firmware from the memory arrangement to the second firmware location and performing a second synchronization of the further slices of the updated firmware from the memory arrangement to the second location until the updated firmware is completed.

In another non-limiting embodiment, an arrangement for performing a download operation is disclosed comprising processor means for detecting an updated firmware for installation in a memory arrangement, means for transmitting at least one slice of the updated firmware from the memory arrangement to a second firmware location, means for performing a synchronization of the at least one slice of the updated firmware to form a copy of the updated firmware, and means for determining after synchronization if the copy of the updated firmware is completed.

In another non-limiting embodiment, a solid state memory device is disclosed comprising at least two NAND memory arrangements, at least two memory non-volatile memory arrangements, at least two volatile memory arrangements connected to the at least two memory, an interface configured to transmit data to and from the memory device, the at least two NAND memory arrangements, the at least two memory non-volatile memory arrangements and the at least two volatile memory arrangements connected to the interface, a controller configured to control the at least two NAND memory arrangements, the at least two memory non-volatile memory arrangements and the at least two volatile memory arrangements and a power supply connected to the volatile memory devices and the controller.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to leveraging either an asynchronous GPDMA hardware unit or a low-power co-processor to perform the background download update slices.

Figure 1:
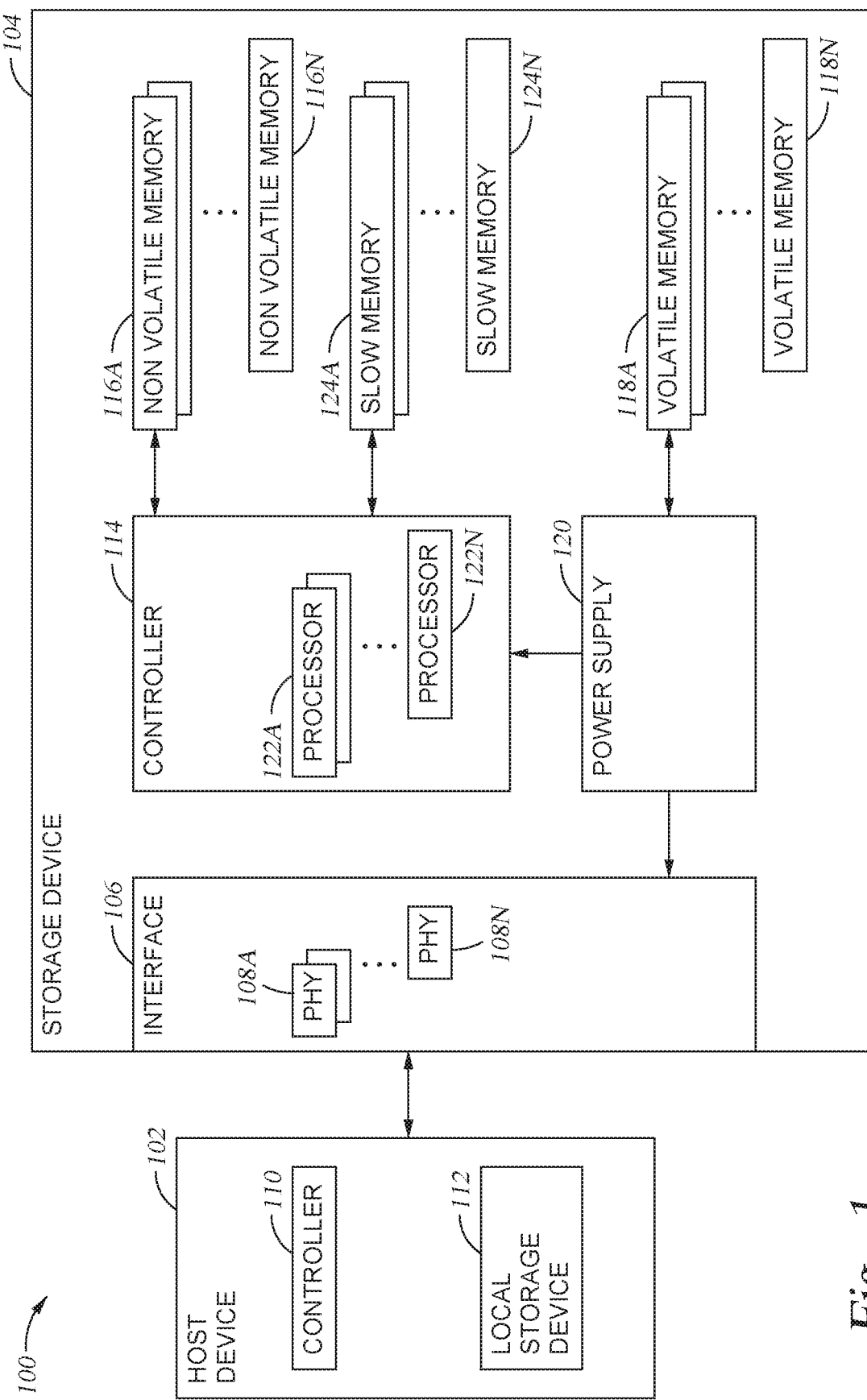
FIG. 1 is a schematic illustration of device according to one embodiment.

FIG. 1 is a schematic illustration of device 100 according to one embodiment. The device includes a host device 102 and a storage device 104. The host device 102 is coupled to the storage device 104 both physically as well as electronically through an interface 106 that contains one or more phys 108A-108N.

The host device 102 includes a controller 110 as well as a local storage device 112 such as an internal memory. The storage device 104 also includes a controller 114 that is coupled to and communicates with the interface 106 as well as both the one or more fast or quick non-volatile memory devices 116A-116N and the one or more volatile memory devices 118A-118N. A power supply 120 is coupled to the interface 106 and controller 114. The controller 114 includes one or more processors 122A-122N. Additionally, the controller 114 is coupled to one or more slow non-volatile memory devices 124A-124N. An example of a slow non-volatile memory device 124A-124N is NOR and an example of fast or quick non-volatile memory devices 116A-116N is NAND.

In some examples, the storage device 104 may include additional components not shown in FIG. 1 for sake of clarity. For example, the storage device 104 may include a printed board (PB) to which components of the storage device 104 are mechanically attached and which includes electrically conductive traces that electrically interconnect components of storage device 104, or the like. In some examples, the physical dimensions and connector configurations of the storage device 104 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe x1, x4, x8, x16, PCIe Mini Card, MiniPCI, etc.). In some examples, storage device 104 may be directly coupled (e.g., directly soldered) to a motherboard of the host device 102.

The interface 106 may operate in accordance with any suitable protocol. For example, the interface 106 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), PCI-express, or Non-Volatile Memory Express (NVMe). The electrical connection of the interface 106 (e.g., the data bus, the control bus, or both) is electrically connected to the controller 114, providing electrical connection between the host device 102 and the controller 114, allowing data to be exchanged between host device the 102 and the controller 114. In some examples, the electrical connection of the interface 106 may also permit the storage device 104 to receive power from the host device 102. For example, as illustrated in FIG. 1, the power supply 120 may receive power from host device the 102 via the interface 106.

The storage device 104 may include the power supply 120, which may provide power to one or more components of the storage device 104. When operating in a standard mode, the power supply 120 may provide power to the one or more components using power provided by an external device, such as the host device 102. For instance, the power supply 120 may provide power to the one or more components using power received from the host device 102 via the interface 106. In some examples, the power supply 120 may include one or more power storage components configured to provide power to the one or more components when operating in a shutdown mode, such as where power ceases to be received from the external device. In this way, the power supply 120 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 104 includes one or more volatile memory devices 118A-118N, which may be used by the controller 114 to temporarily store information. In some examples, the controller 114 may use the one or more volatile memory devices 118A-118N as a cache. For instance, the controller 114 may store cached information in the one or more volatile memory devices 118A-118N until the cached information is written to the one or more non-volatile memory devices 116A-116N. The one or more volatile memory devices 118A-118N may consume power received from the power supply 120 to maintain the data stored in the one or more volatile memory devices 118A-118N. Examples of volatile memory include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

The storage device 104 includes the controller 114, which may manage one or more operations of the storage device 104. For instance, the controller 114 may manage the reading of data from and/or the writing of data to one or more non-volatile memory devices 116A-116N or one or more volatile memory devices 118A-118N. In some examples, the controller 114 may manage the reading of data from and/or the writing of data to the one or more non-volatile memory devices 116A-116N or one or more volatile memory devices 118A-118N by exchanging signals with the one or more non-volatile memory devices 116A-116N or the one or more volatile memory devices 118A-118N. As discussed above, the controller 114 may exchange signals with the one or more non-volatile memory devices 116A-116N or the one or more volatile memory devices 118A-118N in accordance with a communication protocol.

The controller 114 includes one or more processors 122A-122N. The processors 122A-122N may be configured to execute tasks. The tasks may be of different types, and, in some examples, each respective type of task may be stored in or associated with a respective task queue while waiting for execution by the processor 122A-122N. The different types of tasks may include, for example, front end tasks, which may include receiving and interpreting instructions received from the host device 102. Other types of tasks including caching; back-end tasks, which may include reading data from or writing data to non-volatile memory 116; housing-keeping, which may include garbage collection, wear leveling, TRIM, or the like; and system tasks. In some examples, the processor 122A-122N may be referred to as a computer unit, a processing unit, a core, or a central processing unit (CPU).

When firmware is updated, the current firmware is stored in a slow, but fast to power-up non-volatile memory, such as NOR. New firmware can be downloaded to faster non-volatile memory. Ultimately, the new firmware needs to be synced to the NOR, but, errors in syncing can occur, and processing power and speed can be impacted.

As will be discussed in greater detail below, either an asynchronous GPDMA hardware unit or a low-power co-processor performs the background download update slices. The main processor kicks off the dedicated hardware unit when the download data is available for syncing. The dedicated hardware unit then informs the main processor via an interrupt when the slice is synced and the process begins again with the next slice until all slices in the download firmware have been synced.

Stated another way, disruptions may occur during syncing. Using a dedicated hardware function allows the transfer to the NOR from the DRAM buffer to occur more efficiently because the main processor is not used. For example, if processor 122A is the main processor, then a dedicated processor 122N is used to handle the sync operations. The dedicated processor 122N coordinates the transfer so as to not interrupt or impact the main processor 122A operations. The dedicated processor 122N manages the data transfer for the sync while the main processor 122A handles the host device 102 requests normally. It is to be understood that GPDMA (general purpose direct memory access) is but one example of possible hardware units that can be dedicated to handling the sync operations.

The advantages of the disclosure is that the bandwidth of the main processor is minimally impacted during the period of the background download syncing, thus enabling high I/O rates to resume immediately after a few firmware package has been cached to the high-speed memory. This is also more power efficient, as time to complete the syncing is reduced and the main processor is not being used to shuttle the data.

Figure 2:
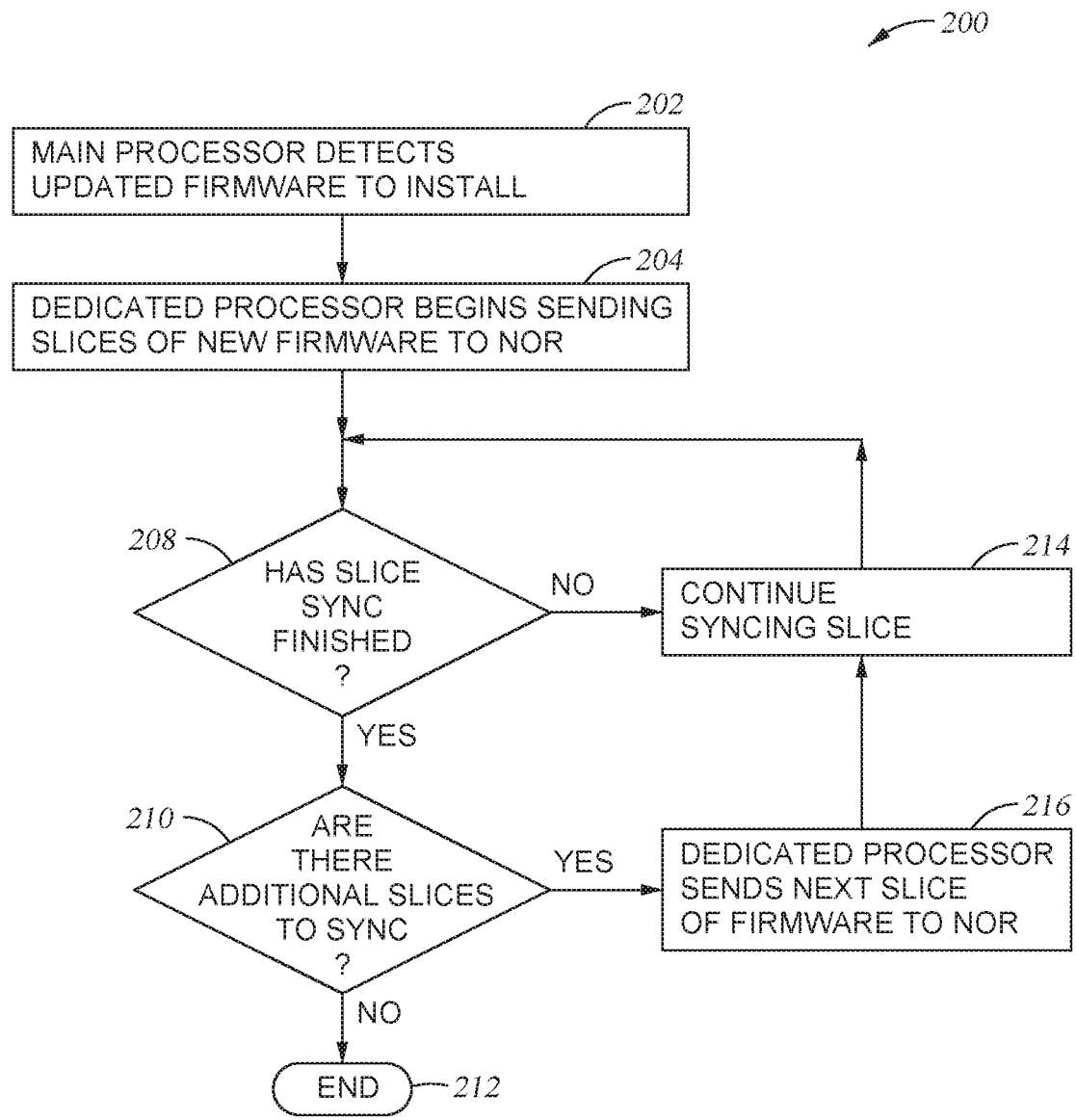
FIG. 2 is a schematic illustration of a method to utilize a dedicated hardware device to coordinate syncing between cache and NOR according to one embodiment.

FIG. 2 is a schematic illustration of a method 200 to utilize a dedicated hardware device to coordinate syncing between cache and NOR according to one embodiment. The process begins at item 202 where the main processor 122A detects that a new firmware needs to be installed. The new firmware is disposed in a storage location other than the NOR. Thereafter, the main processor 122A instructs a dedicated processor 122N to begin sending slices of the firmware update to the NOR in item 204. At item 208, a determination is made in regards to whether the slice sync has completed. If the slice sync has not completed, then the slice syncing continues at item 214 until the slice syncing finishes. If the slice sync has finished at item 208, then at item 210 a determination is made as to whether there are additional slices to sync. If there are no additional slices to sync, then the process ends at item 212. If, however, there are additional slices to sync, then the dedicated processor 122N sends the next slice of new firmware to NOR at item 216. Eventually a determination is made as to whether the additional slice has completed syncing in item 208. Ultimately, after all slices have been synced, the process ends at item 212. It is to be understood that while the dedicated processor 122N is performing the slice sync operation, the main processor 122A is continuing to function normally by processing requests from the host device 102.

By using a slice sync operation with a dedicated processor rather than the main processor, storage device performance will not be negatively impacted by the sync operation, time to sync the firmware is reduced, and the storage device is more power efficient.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

In one non-limiting embodiment, a method for performing a download operation, comprising detecting an updated firmware for installation; transmitting at least one slice of the updated firmware from an updated firmware location to a second firmware location, determining if a synchronization has completed with the at least one slice of the updated firmware, determining if additional slices are to be synchronized when the synchronization has completed with the at least one slice of the updated firmware, sending at least one additional slice of the updated firmware from the updated firmware location to the second firmware location when the determining if the additional slices are to be synchronized when the synchronization has completed with the at least one slice of the updated firmware and performing a synchronization of the at least one additional slice of the updated firmware.

In another non-limiting embodiment, the method may be performed wherein the detecting the updated firmware for installation is performed by a processor.

In another non-limiting embodiment, the method may be performed wherein the processor is a main processor.

In another non-limiting embodiment, the method may be performed wherein the second firmware location is a NOR memory.

In another non-limiting embodiment, the method may be performed wherein the transmitting the at least one slice of the updated firmware from the updated firmware location to the second firmware location is performed by a processor.

In another non-limiting embodiment, the method may be performed wherein the processor is a dedicated processor.

In another non-limiting embodiment, the method may be performed wherein the performing the synchronization of the at least one additional slice of the updated firmware is performed by a dedicated processor.

In another non-limiting embodiment, the method may further comprise continuing a synchronization of the slice when the determining if a synchronization has completed with the at least one slice of the updated firmware.

In another non-limiting embodiment, an arrangement for performing a download operation is disclosed comprising means for detecting an updated firmware for installation, means for transmitting at least one slice of the updated firmware from an updated firmware location to a second firmware location, means for determining if a synchronization has completed with the at least one slice of the updated firmware, means for determining if additional slices are to be synchronized when the synchronization has completed with the at least one slice of the updated firmware and means for sending at least one additional slide of the updated firmware from the updated firmware location to the second firmware location when the determining if the additional slices are to be synchronized when the synchronization has completed with the at least one slice of the updated firmware.

In another non-limiting embodiment, a method for performing a download operation for a memory device is disclosed comprising: using a processor, detecting an updated firmware for installation in a memory arrangement, transmitting at least one slice of the updated firmware from the memory arrangement to a second firmware location, performing a synchronization of the at least one slice of the updated firmware to form a copy of the updated firmware, determining after synchronization if the copy of the updated firmware is completed, transmitting further slices of the updated firmware from the memory arrangement to the second firmware location; and performing a second synchronization of the further slices of the updated firmware from the memory arrangement to the second location until the updated firmware is completed.

In another non-limiting embodiment, the method may further comprise loading the updated firmware.

In another non-limiting embodiment, the method may further comprise erasing firmware that was not the updated firmware.

In another non-limiting embodiment, the method may be performed wherein the second firmware location is a NOR memory.

In another non-limiting embodiment, the method may be performed wherein the transmitting the at least one slice of the updated firmware from the memory arrangement to the second firmware location is along a bus.

In another non-limiting embodiment, the method may further comprise downloading an updated firmware to the memory arrangement.

In another non-limiting embodiment, the method may be performed wherein the memory arrangement is a solid state drive.

In another non-limiting embodiment, the method may be performed wherein the processor is a main processor for the memory device.

In another non-limiting embodiment, the method may be performed wherein the wherein the memory device is a solid state drive.

In another non-limiting embodiment, the method may be performed wherein the loading the updated firmware is from a host.

In another non-limiting embodiment, the method may be performed wherein the host is a one of a personal computer, a server, a music device and a computer tablet.

In another non-limiting embodiment, an arrangement for performing a download operation is disclosed comprising: processor means for detecting an updated firmware for installation in a memory arrangement, means for transmitting at least one slice of the updated firmware from the memory arrangement to a second firmware location, means for performing a synchronization of the at least one slice of the updated firmware to form a copy of the updated firmware, and means for determining after synchronization if the copy of the updated firmware is completed.

In another non-limiting embodiment, the arrangement for performing the download operation further comprises means for transmitting data from the memory arrangement to the second firmware location.

In another non-limiting embodiment, the arrangement for performing the download operation further comprises means for erasing firmware from the memory arrangement.

In another non-limiting embodiment, a solid state memory device is disclosed comprising at least two NAND memory arrangements, at least two memory non-volatile memory arrangements, at least two volatile memory arrangements connected to the at least two memory, an interface configured to transmit data to and from the memory device, the at least two NAND memory arrangements, the at least two memory non-volatile memory arrangements and the at least two volatile memory arrangements connected to the interface, a controller configured to control the at least two NAND memory arrangements, the at least two memory non-volatile memory arrangements and the at least two volatile memory arrangements and a power supply connected to the volatile memory devices and the controller.

In another non-limiting embodiment, the solid state memory device is disclosed wherein the interface further comprises at least two physical connections.

While the foregoing is directed to embodiments of the present disclosure, other and further embodiments of the disclosure may be devised without departing from the basic scope thereof, and the scope thereof is determined by the claims that follow.

What is claimed is:

1. A method for performing a download operation, comprising:
   detecting an updated firmware for installation, wherein the updated firmware is disposed in a data storage device;
   transmitting at least one slice of the updated firmware from an updated firmware location of the data storage device to a second firmware location of the data storage device;
   determining if a synchronization has completed with the at least one slice of the updated firmware;
   determining if additional slices are to be synchronized when the synchronization has completed with the at least one slice of the updated firmware;
   sending at least one additional slice of the updated firmware from the updated firmware location of the data storage device to the second firmware location of the data storage device when the determining if the additional slices are to be synchronized when the synchronization has completed with the at least one slice of the updated firmware; and
   performing a synchronization of the at least one additional slice of the updated firmware.

2. The method according to claim 1, wherein the detecting the updated firmware for installation is performed by a processor.

3. The method according to claim 2, wherein the processor is a main processor.

4. The method according to claim 1, wherein the second firmware location is a NOR memory.

5. The method according to claim 1, wherein the transmitting the at least one slice of the updated firmware from the updated firmware location of the data storage device to the second firmware location of the data storage device is performed by a processor.

6. The method according to claim 5, wherein the processor is a dedicated processor.

7. The method according to claim 1, wherein the performing the synchronization of the at least one additional slice of the updated firmware is performed by a dedicated processor.

8. The method according to claim 1, further comprising:
   continuing a synchronization of the slice when the determining of a synchronization has completed with the at least one slice of the updated firmware.

9. An arrangement for performing a download operation, comprising:
   processor means for detecting an updated firmware disposed in a data storage device for installation;
   processor means for transmitting at least one slice of the updated firmware from an updated firmware location of the data storage device to a second firmware location of the data storage device;
   processor means for determining if a synchronization has completed with the at least one slice of the updated firmware;
   processor means for determining if additional slices are to be synchronized when the synchronization has completed with the at least one slice of the updated firmware; and
   processor means for sending at least one additional slide of the updated firmware from the updated firmware location of the data storage device to the second firmware location of the data storage device when the determining if the additional slices are to be synchronized when the synchronization has completed with the at least one slice of the updated firmware.

10. A method for performing a download operation for a data storage device, comprising:
    using a processor, detecting an updated firmware for installation disposed in an updated firmware location of the data storage device;
    transmitting at least one slice of the updated firmware from the updated firmware location of the data storage device to a second firmware location of the data storage device;
    performing a synchronization of the at least one slice of the updated firmware to form a copy of the updated firmware;
    determining after synchronization if the copy of the updated firmware is completed;
    transmitting further slices of the updated firmware from the updated firmware location of the data storage device to the second firmware location of the data storage device; and
    performing a second synchronization of the further slices of the updated firmware from the updated firmware location of the data storage device to the second firmware location of the data storage device until the updated firmware is completed.

11. The method according to claim 10, further comprising:
    loading the updated firmware.

12. The method according to claim 11, further comprising:
    erasing firmware that was not the updated firmware.

13. The method according to claim 10, wherein the second firmware location is a NOR memory.

14. The method according to claim 10, wherein the transmitting the at least one slice of the updated firmware from the updated firmware location of the data storage device to the second firmware location of the data storage device is along a bus.

15. The method according to claim 10, further comprising:
    downloading an updated firmware to the updated firmware location of the data storage device.

16. The method according to claim 10, wherein the data storage device is a solid state drive.

17. The method according to claim 10, wherein the processor is a main processor for the data storage device.

18. The method according to claim 10, wherein the updated firmware is from a host.

19. The method according to claim 18, wherein the host is a one of a personal computer, a server, a music device and a computer tablet.

20. An arrangement for performing a download operation comprising:
   processor means for detecting an updated firmware for installation in an updated firmware location of a data storage device;
   processor means for transmitting at least one slice of the updated firmware from the updated firmware location of the data storage device to a second firmware location of the data storage device;
   processor means for performing a synchronization of the at least one slice of the updated firmware to form a copy of the updated firmware;
   processor means for determining after synchronization if the copy of the updated firmware is completed;
   processor means for transmitting further slices of the updated firmware from the updated firmware location of the data storage device to the second firmware location of the data storage device; and
   processor means for performing a second synchronization of the further slices of the updated firmware from the updated firmware location of the data storage device to the second firmware location of the data storage device until the updated firmware is completed.

21. The arrangement according to claim 20, further comprising:
   processor means for transmitting data from the updated firmware location of the data storage device to the second firmware location of the data storage device.

22. The arrangement according to claim 20, further comprising:
   processor means for erasing firmware from the updated firmware location of the data storage device.

\* \* \* \* \*